United States Patent
Nair et al.

(10) Patent No.: US 8,849,317 B2
(45) Date of Patent: Sep. 30, 2014

(54) METHOD FOR PAGING LEGACY AND ADVANCED ACCESS TERMINALS

(75) Inventors: Suresh P. Nair, Whippany, NJ (US); Peretz Feder, Englewood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 396 days.

(21) Appl. No.: 13/150,307

(22) Filed: Jun. 1, 2011

(65) Prior Publication Data

US 2011/0312361 A1 Dec. 22, 2011

Related U.S. Application Data

(60) Provisional application No. 61/356,861, filed on Jun. 21, 2010.

(51) Int. Cl.
H04B 7/00 (2006.01)

(52) U.S. Cl.
USPC ........ 455/458; 455/509; 455/515; 455/426.2; 370/328; 709/217

(58) Field of Classification Search
CPC . H04W 68/00; H04W 68/025; H04W 76/048; H04L 29/12311; H04L 45/00; H04L 61/2084; H04L 12/5692
USPC ........... 455/458, 509, 515, 522, 422.1, 426.2, 455/433; 370/328, 338, 352, 400; 709/217, 709/219, 224
See application file for complete search history.

(56) References Cited

U.S. PATENT DOCUMENTS

| | | | | |
|---|---|---|---|---|
| 2011/0051668 A1* | 3/2011 | Lee et al. | ...................... | 370/328 |
| 2011/0053617 A1* | 3/2011 | Lee et al. | ...................... | 455/458 |
| 2011/0105155 A1* | 5/2011 | Bienas et al. | ................. | 455/458 |
| 2011/0122862 A1* | 5/2011 | Yun et al. | ...................... | 370/352 |

FOREIGN PATENT DOCUMENTS

| | | |
|---|---|---|
| WO | WO 2006011775 | 2/2006 |
| WO | WO 2009148258 | 10/2009 |

OTHER PUBLICATIONS

International PCT/US2011/040616 Search Report dated Nov. 15, 2011.
Written Opinion dated Nov. 15, 2011.

* cited by examiner

*Primary Examiner* — Shaima Q Aminzay
(74) *Attorney, Agent, or Firm* — Davidson Sheehan LLP

(57) ABSTRACT

The present invention provides a method for paging legacy and advanced access terminals. One embodiment of the method comprises receiving a notification that an access terminal is entering an idle mode and determining whether the access terminal is a legacy device identified by a fixed length identifier or an advanced device identified by one of a plurality of mode-dependent identifiers. The mode-dependent identifier is used to identify the advanced device in the idle mode. This embodiment may also include allocating one or more first paging cycles to the access terminal when it is a legacy device or one or more second paging cycles to the access terminal when it is an advanced device. The first and second paging cycles are different.

18 Claims, 7 Drawing Sheets

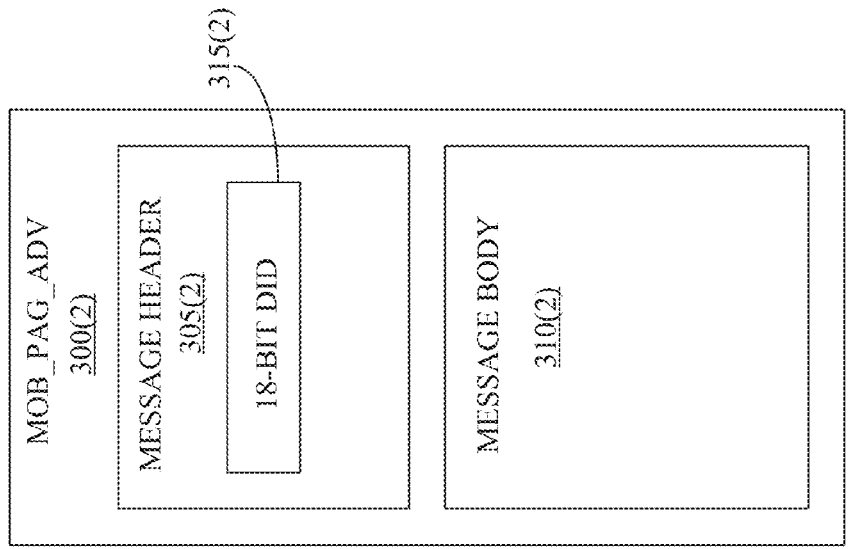
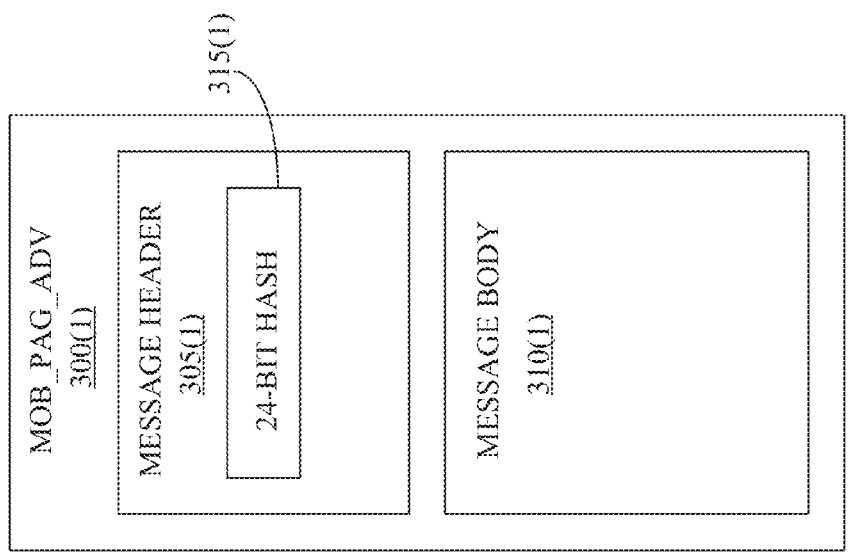

| Field | Size (bits) | Value/Description | Condition |
|---|---|---|---|
| Paging_Group_IDs bitmap | 1 | Indicate that the paging information for the corresponding paging group is included in AAI-PAG-ADV message. The length of Paging_Group_IDs bitmap is same as Num_PGIDs in PGID-Info message. 0: the paging information for the corresponding PGID is not included 1: the paging information for the corresponding PGID is included | L equals the Num_PGIDs in PGID-Info message |
| For (i=0; i<M; i++) { | | | M equals the number of bits in Paging_Group_IDs bitmap whose bit is set to 1. |
| For (j=0; j<Num_AMSs; j++) { | | Num_AMSs indicates the number of paged AMSs in a corresponding paging group 1..32 | |
| Deregistration Identifier | 18 | Used to indicate Deregistration ID for the AMS to be paged (Deregistration Identifier and Paging Cycle are used to identify each paged AMS) $0..2^{18}-1$ | Present if the S-SFH Network Configuration bit == 0b0 |
| MAC Address Hash | 24 | used to identify the AMS to be paged | Present if the S-SFH Network Configuration bit == 0b1 |
| Paging Cycle | 4 | Used to indicate Paging cycle for the AMS to be paged 0x00: 4 superframes 0x01: 8 superframes 0x02: 16 superframes 0x03: 32 superframes 0x04: 64 superframes 0x05: 128 superframes 0x06: 256 superframes 0x07: 512 superframes 0x08-0x15: reserved | Present if the S-SFH Network Configuration bit == 0b0 |
| Action code | 1 | Used to indicate the purpose of the AAI-PAG-ADV message 0b0: perform network reentry 0b1: perform ranging for location update | |
| } | | | |
| } | | | |

FIG. 7

METHOD FOR PAGING LEGACY AND ADVANCED ACCESS TERMINALS

CROSS REFERENCE TO RELATED APPLICATIONS

Cross Reference to Related Applications

This application claims the benefit of the filing date of U.S. Provisional Application Ser. No. 61/356,861, filed Jun. 21, 2010, entitled "Method for IEEE 802.16m Paging Operation in Networks Simultaneously Supporting Legacy and Advanced MSs".

This application is related to U.S. patent application Ser. No. 13/150,321, filed on Jun. 1, 2011, which claims the benefit of the filing date of U.S. Provisional Application Ser. No. 61/356,826, filed Jun. 21, 2010, entitled "Method for Managing IEEE 802.16m Advanced MS States and Identifiers in a Wireless Network."

BACKGROUND

This invention relates generally to communication systems, and, more particularly, to wireless communication systems.

Conventional wireless communication systems use a network of base stations or other access nodes to provide wireless connectivity to a large and often mobile population of access terminals. Each access terminal can be identified to the wireless communication system by an identifier that is permanently assigned or "burned in" to the mobile unit. For example, implementations of WiMAX release 1 that are based on the standards and protocols defined by IEEE 802.16e (2009) use a constant 48-bit mobile station identifier (MS-ID) to identify the access terminals in the network. The MS-ID is typically installed or programmed by the manufacturer of the access terminal in the form of a media access control (MAC) identifier. For another example, wireless communication systems that operate according to the Global System for Mobile communications (GSM) and/or Universal Mobile Telecommunication Services (UMTS) standards and/or protocols may use a 64-bit International Mobile Subscriber Identity (IMSI) to identify each mobile unit or access terminal.

The conventional mobile station identifier is used to identify the access terminal within the network and over the air. For example, access terminals can be paged over the air by transmitting a hashed value derived from the identifier, e.g., a 24-bit hash of a 48-bit identifier can be used to page access terminals. Access terminals can also be associated with different identifiers in different circumstances. For example, WiMAX networks that operate according to IEEE 802.16m standards and/or protocols may identify access terminals using a set of identification numbers that range in length from 10 bits to 72 bits depending on the operational state of the access terminal Consequently, the identifier that is used by the network and over the air varies as the operational mode changes, e.g., as the access terminal shifts between sleeping, dormant, idle, active, or other operational states. For example, idle access terminals that comply with IEEE 802.16m can be identified by an 18-bit de-registration identifier that can be used to page access terminals over the air interface.

SUMMARY

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for paging legacy and advanced access terminals. One embodiment of the method comprises receiving a notification that an access terminal is entering an idle mode and determining whether the access terminal is a legacy device identified by a fixed length identifier or an advanced device identified by one of a plurality of mode-dependent identifiers. The mode-dependent identifier is used to identify the advanced device in the idle mode. This embodiment may also include allocating one or more first paging cycles to the access terminal when it is a legacy device or one or more second paging cycles to the access terminal when it is an advanced device. The first and second paging cycles are different.

In another embodiment, a method is provided for paging legacy and advanced access terminals. One embodiment of the method comprises receiving at least one message addressed to an idle access terminal and determining whether the idle access terminal is a legacy device identified by a fixed length identifier or an advanced device identified by one of a plurality of mode-dependent identifiers. The mode-dependent identifier is used to identify the advanced device in the idle mode. This embodiment may also include paging the idle access terminal during one or more first paging cycles when it is a legacy device and one or more second paging cycles when it is an advanced device.

BRIEF DESCRIPTION OF THE DRAWINGS

The disclosed subject matter may be understood by reference to the following description taken in conjunction with the accompanying drawings, in which like reference numerals identify like elements, and in which:

FIG. 7 is a table of examples of parameters for one embodiment of a paging advertisement message format.

Figure 1:
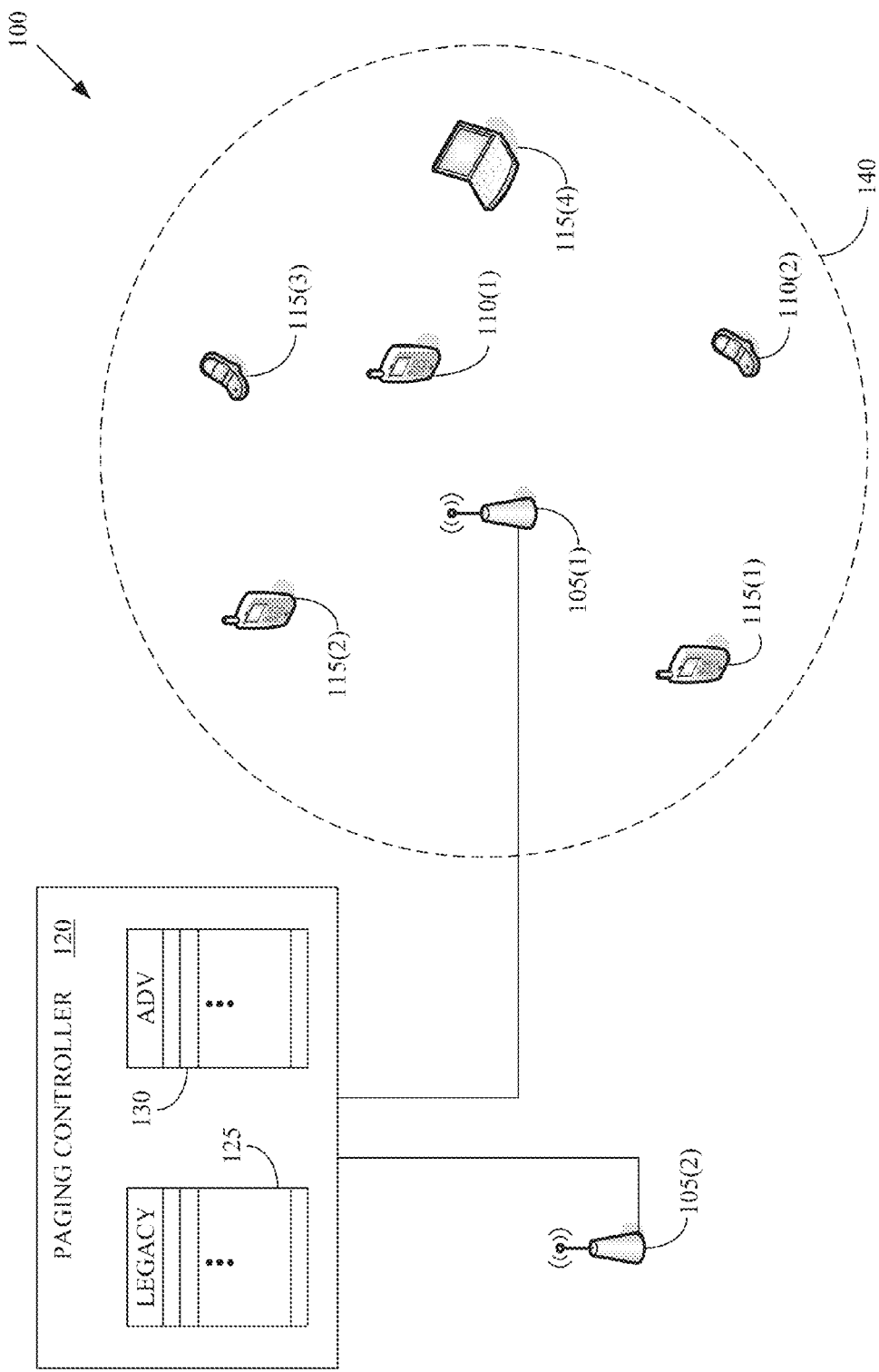
FIG. 1 conceptually illustrates one exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques that are used to support paging of different types of access terminals in a wireless communication system. As wireless communication continues to evolve, systems may be required to support communication with access terminals that operate according to different standards and/or protocols. For example, legacy and advanced access terminals may be identified with identifiers having different lengths and/or identifiers that are selected for the access terminal based upon its operational mode. Conventional paging techniques do not support multiple paging formats. For example, paging controllers that operate according to the 802.16e standards and/or protocols may identify and page idle access terminals on the basis of a 24-bit hash of a 48-bit mobile station identifier. However, subsequent standards may identify and page idle access terminals on the basis of different identifiers. For example, the 802.16m standards identify idle access terminals using a deregistration identifier that is one of several mode-dependent identifiers associated with the advanced access terminal Embodiments of deregistration identifiers may include 18 bits although other bit numbers could be used in other embodiments.

The present application therefore describes embodiments of techniques that can support identification and paging of legacy and advanced access terminals. In one embodiment, a paging controller determines when an access terminal is entering the idle mode and determines whether the access terminal is a legacy or advanced device. Legacy devices are identified by their fixed length identifiers (such as the 48-bit mobile station identifier) and advanced devices are identified by the mode-dependent identifier allocated in the idle mode. Different paging cycles and/or paging offsets may then be allocated to groups of legacy devices and groups of advanced devices. The paging cycle/offset information and idle mode identifiers for the access terminals can then be dynamically stored, e.g., in a database associated with the paging controller. When the system needs to locate an access terminal, it determines whether the access terminal is a legacy or advanced device and then forms a paging advertisement message using the appropriate identifier. Paging advertisements may then be transmitted to legacy devices in the set of legacy paging cycles/offsets in the legacy format or to advanced devices in the mutually exclusive set of paging cycles/offsets in the advanced format.

FIG. 1 conceptually illustrates one exemplary embodiment of a wireless communication system 100. In the illustrated embodiment, the wireless communication system 100 includes a plurality of access nodes 105 such as base stations that are used to provide wireless connectivity. For example, the access node 105(1) provides wireless connectivity within a geographical region such as a cell 140. The access nodes 105 depicted in FIG. 1 operate according to WiMAX standards and/or protocols such as the standards and/or protocols defined by IEEE 802.16m. However, persons of ordinary skill in the art having benefit of the present disclosure should appreciate that alternative embodiments of the wireless communication system 100 may include access nodes and/or access terminals that operate according to other standards and/or protocols. For example, the access node 105(2) may support wireless communication according to one or more legacy standards and/or protocols. Moreover, alternate embodiments of the techniques described herein may be implemented in other types of systems and/or devices that use wireless communication techniques.

Access terminals 110 such as mobile units can access the wireless communication system 100 over an air interface between the access terminals 110 and the access node 105. In the illustrated embodiment, the access terminals 110 are legacy devices that use a single fixed length identifier to identify the access terminals 110 over the air interface and throughout the network. Exemplary fixed length identifiers include 48-bit mobile station identifiers that are used in WiMAX systems that operate according to IEEE 802.16e standards and/or protocols. Alternatively, in GSM and/or UMTS systems, identifiers such as International Mobile Subscriber Identity (IMSI) numbers may be used to identify the legacy access terminals 110. Fixed length identifiers may be assigned to access terminals 110 when they are manufactured and/or configured prior to use within the network 100. Fixed length identifiers are typically permanently allocated so that they can always be used to uniquely identify an access terminal 110.

Access terminals 115 operate according to different standards and/or protocols than the access terminals 110. In the illustrated embodiment, the access terminals 115 are advanced devices that can be identified over the air interfaces using one of a set of mode-dependent identifiers. As used herein, the term "mode-dependent identifier" is used to indicate that the different mode-dependent identifiers are used to identify the access terminal 115 in different operational modes. In one embodiment, the different identifiers may have different lengths. For example, identifiers of 10 bits, 12 bits, 18 bits, 24 bits, 48 bits, or 72 bits may be used as one or more of the mode-dependent identifiers. In one embodiment, the set of mode-dependent identifiers is defined by the relevant standards and/or protocols. For example, the WiMAX standards and/or protocols may define the set of available mode-dependent identifiers in the manner indicated in Table 1. However, persons of ordinary skill in the art having benefit of the present disclosure should appreciate that the particular set of mode-dependent identifiers shown in Table 1 is intended to be exemplary and other sets may be defined for alternative embodiments.

TABLE 1

| ID NAME | LENGTH | DESCRIPTION |
| --- | --- | --- |
| MAC ID | 48 bits | When it is used in header |
| STID Station ID | 12 bits | Used when MS is connected |
| TSTID Temporary Station ID | 12 bits | Used until STID is allocated |
| DID De-registration ID | 18 bits | Used when MS is in idle mode |
| CRID Context Retention ID | 72 bits | Assigned during initial network entry |
| MSTID Multicast Station ID | 12 bits | Identifies multicast broadcast flows with flow identifier |

The access terminals 110, 115 may implement different operational modes such as an active mode and an inactive or idle mode. The active mode is used when the access terminal 110, 115 has an active communication session or call with the system 100. Access terminals 110, 115 may conserve power and air interface resources by entering the idle mode when it is not actively communicating with the system 100. In one embodiment, the idle mode allows the access terminal 110, 115 to use lower power modes and to not be registered with any access node 105 and yet the access terminal 110, 115 may receive downlink broadcast traffic, e.g., when it wakes up during an allocated paging cycle and/or paging offset to monitor a paging channel. Idle access terminals 110, 115 can be paged when downlink traffic arrives in the system 100. For example, one or more of the access nodes 105 may form a paging group associated with a paging controller that is used to page the idle access terminal 110, 115 located in the vicinity of the access nodes. Access terminals 110, 115 may be assigned to a paging controller in the paging group by the access node 105 before going into idle mode and the access terminals 110, 115 may periodically wake up to either receive data or to update location change with their paging controller.

In the illustrated embodiment, the wireless communication system 100 includes one or more paging controllers 120 that are used to support paging operations in the wireless communication system 100. Exemplary embodiments of the paging controllers 120 may be implemented in different network entities such as access serving network gateways (ASN-GWs). Access terminals 110, 115 are assigned a paging controller 120 when they are preparing to enter the idle mode. For example, an access terminal 110, 115 that is entering the idle mode may send a message to the associated access node 105, which may then convey this information to the paging controller 120 to provide notification of idle mode entry. Since the access terminals 110 use a different idle mode identifier than the access terminals 115, the paging controller 120 handles the idle mode entry of the different types of access terminals 110, 115 in different ways. In the illustrated embodiment, the paging controller 120 determines whether the requesting device is a legacy device such as an access terminal 110 or an advanced device such as an access terminal 115. The fixed length identifiers for idle legacy devices are stored in a first database 125 and the identifier for idle advanced devices are stored in a second database 130. Persons of ordinary skill in the art having benefit of the present disclosure should appreciate that alternative embodiments may use other techniques for identifying and grouping legacy and advanced devices, such as using a single database with entries that include a field that indicates legacy or advanced devices.

Different time intervals are allocated for paging the advanced and legacy devices. In the illustrated embodiment, mutually exclusive sets or sequences of paging cycles are allocated to idle access terminals 110 and idle access terminals 115, respectively. For example, idle legacy access terminals 110 may be allocated to paging cycles that are identified by an even value of a paging cycle number and idle advanced access terminals 115 may be allocated to paging cycles that are identified by an odd value of a paging cycle number. However, other mutually exclusive or non-overlapping sets or sequences of paging cycles may be allocated to the legacy and advanced devices. For example, in systems that are expected to include a relatively large number of advanced access terminals 115 relative to the number of legacy access terminals 110, a relatively larger proportion of the paging cycles may be allocated to advanced devices. Moreover, the mutually exclusive time intervals used to page the different types of devices may be defined in terms of paging offsets in addition to or instead of distinguishing between the different paging intervals on the basis of paging cycles. Information identifying the allocated paging time intervals, cycles, and/or offsets may then be transmitted to the access terminals 110, 115 so that they will know to monitor a paging channel for paging advertisement messages during the appropriate paging time interval, cycle, and/or offset.

Figure 2:
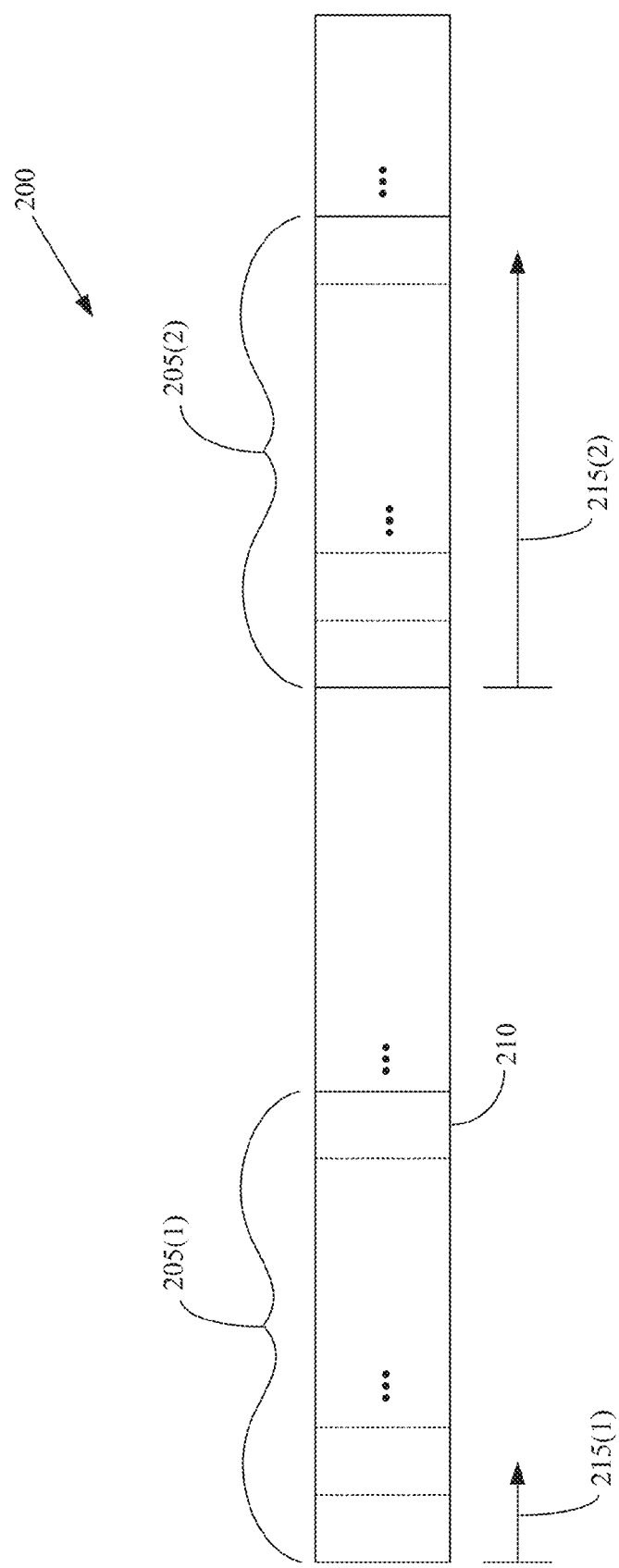
FIG. 2 conceptually illustrates one exemplary embodiment of a sequence of paging cycles and paging offsets FIGS. 3A and 3B conceptually illustrate embodiments of paging advertisement messages for legacy devices and advanced devices, respectively.

FIG. 2 conceptually illustrates one exemplary embodiment of a sequence 200 of paging cycles and paging offsets. In the illustrated embodiment, the sequence 200 includes a series of paging cycles 205 that repeat over time. Each paging cycle 205 includes a plurality of time slots or time intervals 210 that may be indicated using a corresponding paging offset 215. The paging cycles 205(1) and/or paging offsets 215(1) may be allocated to legacy devices so that idle legacy devices can monitor paging channels during the indicated time intervals. The paging cycles 205(2) and/or paging offsets 215(2) may be allocated to advanced devices so that idle advanced devices can monitor paging channels during the indicated time intervals.

Referring back to FIG. 1, the paging controller 120 can page one or more of the idle access terminals 110, 115 in response to receiving information and/or messages addressed to the corresponding access terminals 110, 115. In one embodiment, the network 100 receives a message that is addressed to an idle access terminal 110. The paging controller 120 (or other entity within the network 100) then determines whether the idle access terminal 110 is a legacy device or an advanced device. For example, the paging controller 120 may use the access terminal address to find the appropriate identifier in either the legacy database 125 or the advanced database 130. Alternatively, the paging controller 120 may search for the identifier and then use information in the database to determine whether the device is a legacy device or an advanced device. Based on this determination, the paging controller 120 may create a paging advertisement message and distribute this message to the various access nodes 105.

Different idle mode addresses or identifiers are used to page legacy and advanced devices. Paging advertisement messages for legacy devices may include a hashed version of the legacy identifier and they may be transmitted over the air interface during the allocated legacy paging cycles and/or paging offsets. For example, the idle mode address may be a 24-bit field used to hash the access terminals 48-bit media access control (MAC) address. The hash value may be defined as the remainder of the division (modulo-2) of the 48-bit address multiplied by a polynomial D24 that is derived using the generator polynomial: $g(D)=D^{24}+D^{23}+D^{18}+D^{17}+D^{14}+D^{11}+D^{10}+D^7+D^6+D^5+D^4+D^3+D+1$ For example, the 48-bit address 00:D0:59:0F:E2:2E would hash to the 24-bit identifier 0x51efe3 in this embodiment. Paging advertisement messages for advanced devices may include the appropriate idle mode identifier and they may be transmitted over the air interface during the allocated advanced paging cycles and/or paging offsets. In one embodiment, the idle mode identifier is a deregistration identifier that uniquely identifies the advanced access terminal within a set defined by a paging group identifier, a paging cycle, and a paging offset. Exemplary parameters for one embodiment of a paging advertisement message format are shown in the table in FIG. 7. However, persons of ordinary skill in the art having benefit of the present disclosure should appreciate that the particular set of parameters shown in the table in FIG. 7 is intended to be exemplary and other sets may be defined for alternative embodiments.

FIGS. 3A and 3B conceptually illustrate embodiments of paging advertisement messages 300(1-2) for legacy devices and advanced devices, respectively. In the illustrated embodiment, each paging advertisement message includes a message header 305 and a message body 310. The message header 305 includes an identifier 315 of the access terminal that is being paged. Paging advertisement messages 300(1) that are addressed to legacy devices may include an idle mode identifier 315(1) that is derived from the permanent mobile station identifier. For example, the idle mode identifier 315(1) used to identify legacy devices may be a 24-bit hashed version of the permanent 48-bit mobile station identifier assigned to the legacy device. Paging advertisement messages 300(2) that are addressed to advanced devices may include an idle mode identifier 315(2) such as a deregistration identifier that is defined by the relevant standards and/or protocols, such as the IEEE 802.16m standards for WiMAX. Alternatively, a pseudo-identifier can be allocated to the advanced device and then the pseudo-identifier may be used to generate the idle mode identifier 315(2). For example, a 48-bit pseudo-identifier can be allocated to the advanced device on initial network entry and then a hashed version of the pseudo-identifier can be used as the idle mode identifier 315(2). The pseudo-identifier may be selected to reduce or avoid the possibility of collisions with legacy mobile station identifiers and/or hashed versions of the legacy mobile station identifiers associated with other legacy devices.

Figure 4:
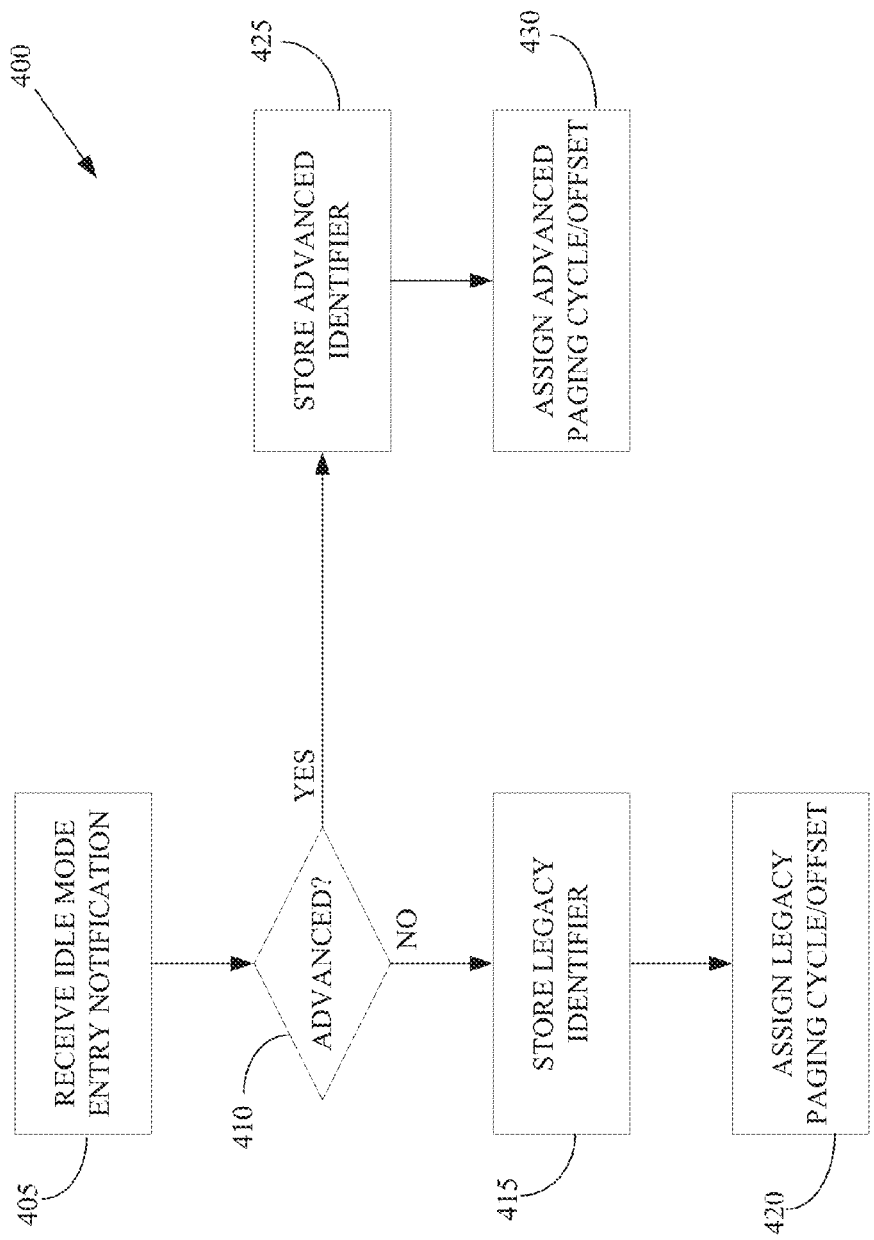
FIG. 4 conceptually illustrates one exemplary embodiment of a method for setting the paging parameters of an access terminal.

FIG. 4 conceptually illustrates one exemplary embodiment of a method 400 for setting the paging parameters of an access terminal. In the illustrated embodiment, a notification is received (at 405) indicating that an access terminal is entering the idle mode, e.g., by switching to a lower power mode and releasing air interface resources. The notification may be received at an access node and then conveyed to other entities in the network such as a paging controller. In response to receiving the notification, the network determines (at 410) whether the access terminal is a legacy device or an advanced device. If the access terminal is a legacy device that uses a single fixed length identifier to identify the device, the legacy identifier may be stored (at 415). For example, the paging controller may store (at 415) the legacy identifier in a database. The database may be implemented as a separate database used only for legacy devices or it may be implemented as part of a single database that is used for both legacy and advanced databases. In embodiments that use a single database for both types of device, the paging controller may also store (at 415) information indicating that the access terminal is a legacy device. The paging controller assigns (at 420) one or more paging cycles and/or paging offsets to the legacy device. This information may be stored and also conveyed to the access terminal and appropriate access nodes so that they know which paging cycles and/or paging offsets should be monitored and/or used to page the access terminal.

If the network determines (at 410) that the access terminal is an advanced device that uses mode-dependent identifiers depending on the operational mode of the advanced device, then the appropriate advanced idle mode identifier may be stored (at 425) the database. As discussed herein, the database may be specifically allocated to advanced devices or maybe part of a database that stores information for both legacy and advanced devices. In one embodiment, the idle mode identifier is a deregistration identifier that is one of the mode-dependent identifiers associated with the advanced device. Alternatively, a 48 bit pseudo-identifier may be assigned to the advanced device, e.g., at initial network entry, and then the pseudo-identifier may be used as the idle mode identifier and stored (at 425) in the database. The paging controller assigns (at 430) one or more paging cycles and/or paging offsets to the advanced device. The paging cycles and/or offsets assigned to the advanced device are different than the paging cycles and/or offsets assigned to legacy devices. For example, mutually exclusive sequences of paging cycles/offsets may be allocated to legacy and advanced devices. This information may be stored and also conveyed to the access terminal and appropriate access nodes so that they will know which paging cycles and/or paging offsets should be monitored and used to page the access terminal.

Figure 5:
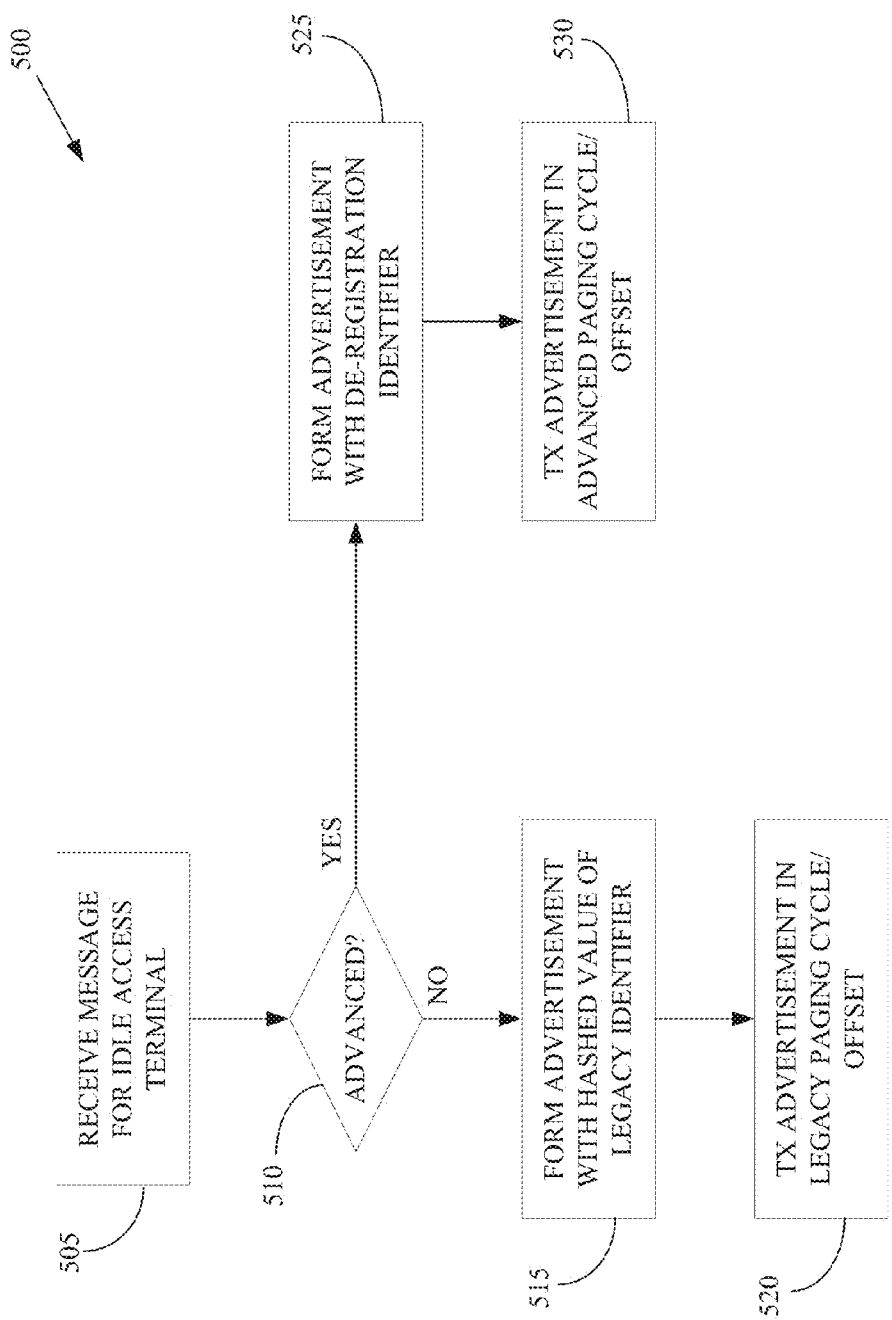
FIG. 5 conceptually illustrates one exemplary embodiment of a method of for paging legacy devices and/or advanced devices.

FIG. 5 conceptually illustrates one exemplary embodiment of a method of 500 for paging legacy devices and/or advanced devices. In the illustrated embodiment, the network receives (at 505) a downlink message that is addressed to an idle access terminal. In response to receiving the message, an entity in the network such as a paging controller determines (at 510) whether the idle access terminal is a legacy device or an advanced device. If the idle access terminal is a legacy device, then the paging controller may form (at 515) a paging advertisement message using the legacy fixed length identifier. For example, the paging controller may form (at 515) a 24-bit hashed version of a 48-bit mobile station identifier and then includes the hashed identifier in the paging advertisement message. The paging advertisement message may then be transmitted (at 520) or broadcast over the air interface in the paging cycles and/or offsets allocated to legacy devices using one or more access nodes. For example, the paging controller may distribute the paging advertisement message to different groups of access nodes according to a predetermined paging scheme or algorithm until the paging controller receives a response from the access terminal.

If the idle access terminal is an advanced device, then the paging controller can form (at 525) a paging advertisement message using an idle mode identifier such as the deregistration identifier associated with the access terminal. For example, the paging controller may include the deregistration identifier in the paging advertisement message. Exemplary deregistration identifiers may include 12 bits, 18 bits, 24 bits, or other numbers of bits. A 24-bit deregistration identifier may advantageously be used to harmonize the identifiers used by legacy and advanced devices by using the same number of bits in the deregistration identifier used by advanced devices and the hashed version of the fixed length identifier used by legacy devices. Alternatively, the idle access terminal may be identified using a hashed version of a pseudo-identifier assigned to advanced devices, e.g., at initial network entry of the access terminal. The paging advertisement message may then be transmitted (at 530) or broadcast by one or more access nodes over the air interface in the paging cycles and/or offsets allocated to the advanced devices. For example, the paging controller may distribute the paging advertisement message to different groups of access nodes according to a predetermined paging scheme or algorithm until the paging controller receives a response from the access terminal via one of the access modes.

Figure 6:
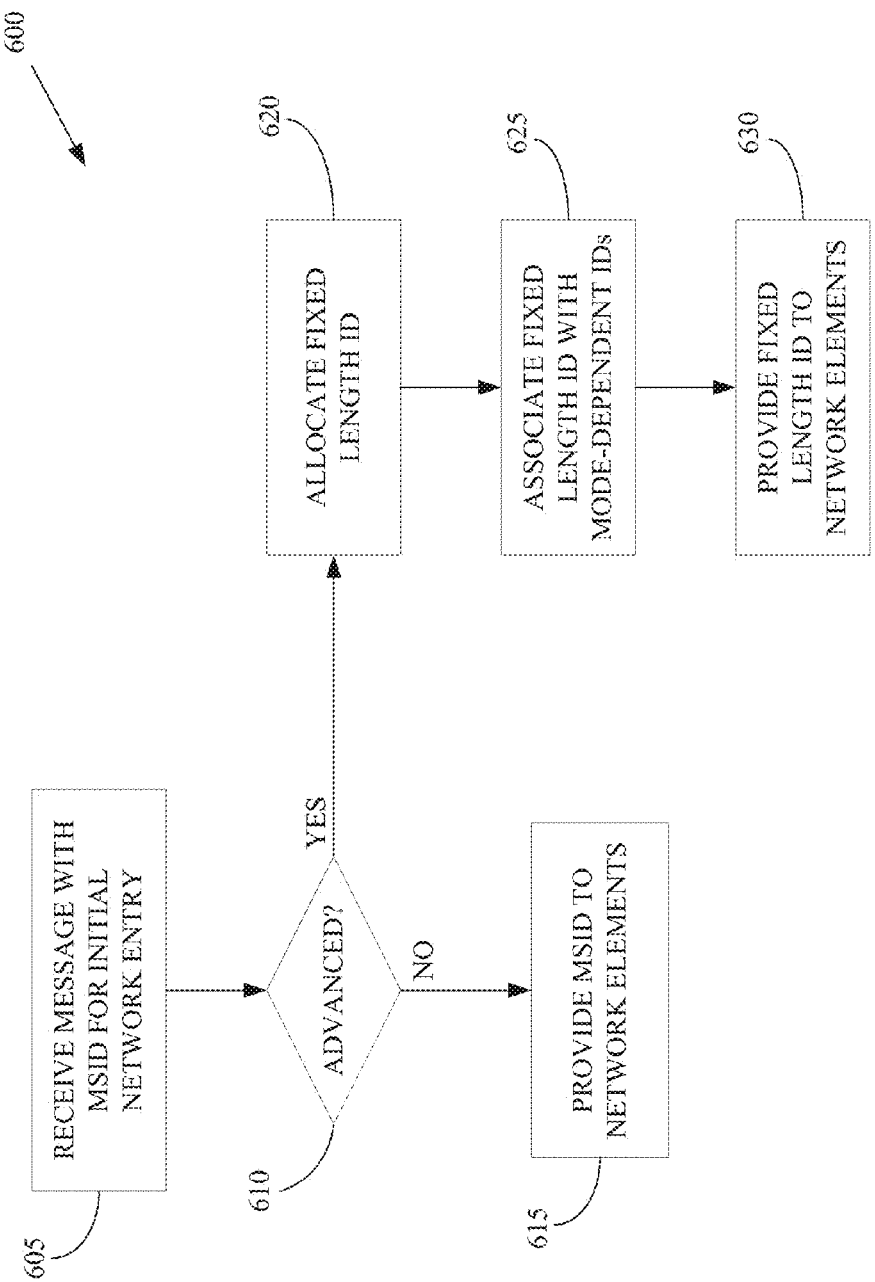
FIG. 6 conceptually illustrates one exemplary embodiment of a method for allocating fixed length identifiers such as pseudo-identifiers to access terminals.

FIG. 6 conceptually illustrates one exemplary embodiment of a method 600 for allocating fixed length identifiers such as pseudo-identifiers to access terminals. In the illustrated embodiment, an entity in the network such as a base station or other access nodes such as ASN-GW or core network nodes receives (at 605) a message during initial network entry of an access terminal. The received message includes information indicating the identity of the access terminal. In one embodiment, the identity of the access terminal is indicated using the true or permanent mobile station identifier, e.g., the 48 bit identifier that is given to the access terminal when it is manufactured and/or configured. The network entity then determines (at 610) whether the access terminal is a legacy device or an advanced device that supports the use of mode-dependent identifiers to identify the access terminal during communication over an air interface. If the access terminal is a legacy device, then the mobile station identifier can be provided (at 615) to other network elements such as ASN-GWs, AAA servers, and the like so that these network-side elements can use the identifier to identify the access terminal. Alternatively, the network entity may assign a pseudo-identifier that has the same number of bits as the mobile station identifier and then provide (at 615) the pseudo-identifier to the network so that the pseudo-identifier can be used to identify the access terminal without revealing the true mobile station identifier.

If the network entity determines (at 610) that the access terminal supports mode-dependent identifiers, then a fixed length identifier can be allocated (at 620) to the access terminal. The fixed length identifier can then be used to identify the access terminal, e.g., in messages transmitted over interfaces between network elements such as base stations, ASN-GWs, AAA servers, and the like. For example, the fixed length identifier may be a 48 bit identifier allocated to the access terminal. The fixed length identifier may be a random number or may be derived from one or more other identifiers for information associated with the access terminal. The fixed length identifier may also be associated (at 625) with the mode-dependent identifiers that are used to identify the access terminal and communications over the air interface. In one embodiment, the network entity creates a database entry including the information that associates the fixed and mode-dependent identifiers for the access terminal. The database can be accessed to map or translate between fixed and mode-dependent identifiers for uplink and/or downlink communication. The network entity can then provide (at 630) the fixed length identifier to other elements in the network. In various embodiments, portions of the method 600 may be performed before, concurrently with, or after authentication, authorization, and/or accounting processes are performed for the access terminal.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method for paging access terminals, comprising:
receiving a notification that an access terminal is entering an idle mode;
determining whether the access terminal is a legacy device identified by a fixed length identifier or an advanced device identified by one of a plurality of mode-dependent identifiers, wherein said one of the mode-dependent identifiers is used to identify the advanced device in the idle mode; and
allocating at least one first paging cycle to the access terminal when it is a legacy device or at least one second paging cycle to the access terminal when it is an advanced device, the at least one second paging cycle being different than said at least one first paging cycle.

2. The method of claim 1, wherein determining whether the access terminal is a legacy device or an advanced device comprises determining whether the access terminal is a legacy device or an advanced device using information associated with the access terminal that is stored in an access node associated with the access terminal.

3. The method of claim 1, wherein allocating said at least one first paging cycle or said at least one second paging cycle comprises allocating a first sequence of first paging cycles or a second sequence of second paging cycles, wherein the first and second sequences comprise mutually exclusive paging cycles.

4. The method of claim 3, wherein allocating the first sequence or the second sequence comprises allocating a first sequence comprising paging cycles that have even paging cycle numbers or a second sequence comprising paging cycles that have odd paging cycle numbers.

5. The method of claim 1, wherein allocating said at least one first paging cycle or said at least one second paging cycle comprises allocating a paging offset within said at least one first paging cycle or said at least one second paging cycle.

6. The method of claim 1, comprising storing the fixed length identifier when the access terminal is a legacy device and storing said one of the mode-dependent identifiers when the access terminal is an advanced device.

7. The method of claim 6, wherein storing said one of the mode-dependent identifiers comprises storing an 18-bit deregistration identifier that is used to identify the access terminal when the access terminal is in the idle mode.

8. The method of claim 7, comprising receiving information addressed to the access terminal and forming a paging advertisement message comprising a hashed representation of the fixed length identifier when the access terminal is a legacy device or the de-registration identifier when the access terminal is an advanced device.

9. The method of claim 6, wherein storing said one of the mode-dependent identifiers comprises storing a pseudo-identifier that is the same length as a fixed length identifier used by legacy devices.

10. The method of claim 9, comprising receiving information addressed to the access terminal and forming a paging advertisement message comprising a hashed representation of the fixed length identifier when the access terminal is a legacy device or a hashed representation of the pseudo-identifier when the access terminal is an advanced device.

11. The method of claim 8 or 10, comprising transmitting the paging advertisement message in said at least one first paging cycle when the access terminal is a legacy device or said at least one second paging cycle when the access terminal is an advanced device.

12. A method for paging access terminals, comprising:
receiving at least one message addressed to an idle access terminal;
determining whether the idle access terminal is a legacy device identified by a fixed length identifier or an advanced device identified by one of a plurality of mode-dependent identifiers, wherein said one of the mode-dependent identifiers is used to identify the advanced device in the idle mode; and
paging the idle access terminal during at least one first paging cycle when it is a legacy device and at least one second paging cycle when it is an advanced device, the at least one second paging cycle being different than said at least one first paging cycle.

13. The method of claim 12, comprising allocating said at least one first paging cycle or said at least one second paging cycle to the access terminal when it is an advanced device in response to receiving a notification that the access terminal is entering an idle mode.

14. The method of claim 12, wherein paging the idle access terminal comprises paging the idle access terminal in at least one of a first plurality of first paging cycles when the idle access terminal is a legacy device or one of a first plurality of second paging cycles when the idle access terminal is an advanced device, and wherein the first and second pluralities comprise mutually exclusive paging cycles.

15. The method of claim 12, wherein paging the idle access terminal comprises paging the idle access terminal during at least one time interval in said at least one first paging cycle or said at least one second paging cycle, wherein said at least one time interval is determined based upon a paging offset associated with the access terminal.

16. The method of claim 12, wherein paging the idle access terminal comprises forming a paging advertisement message comprising a hashed representation of the fixed length identifier when the access terminal is a legacy device or an 18-bit de-registration identifier when the access terminal is an advanced device.

17. The method of claim 12, wherein paging the idle access terminal comprises forming a paging advertisement message comprising a hashed representation of the fixed length identifier when the access terminal is a legacy device or a hashed representation of a pseudo-identifier allocated to the access terminal when the access terminal is an advanced device.

18. The method of claim 16 or 17, comprising transmitting the paging advertisement message in said at least one first paging cycle when the access terminal is a legacy device or said at least one second paging cycle when the access terminal is an advanced device.

* * * * *